United States Patent
Ji

(10) Patent No.: US 7,567,396 B2
(45) Date of Patent: Jul. 28, 2009

(54) VARIABLY FOCUSING MIRROR DRIVEN BY ELECTROMAGNETIC FORCE AND OPERATING METHOD THEREOF

(75) Inventor: Chang-Hyeon Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 357 days.

(21) Appl. No.: 11/399,532

(22) Filed: Apr. 7, 2006

(65) Prior Publication Data
US 2006/0250927 A1 Nov. 9, 2006

(30) Foreign Application Priority Data
Apr. 8, 2005 (KR) .................. 10-2005-0029549

(51) Int. Cl.
*G02B 7/02* (2006.01)
*G02B 17/00* (2006.01)
*G02B 7/182* (2006.01)
(52) U.S. Cl. .................. 359/824; 359/726; 359/846
(58) Field of Classification Search ................ 359/290, 359/291, 726, 846, 847, 824
See application file for complete search history.

(56) References Cited

U.S. PATENT DOCUMENTS

| | | | | |
|---|---|---|---|---|
| 6,726,338 B2* | 4/2004 | Kaneko | ................ | 359/846 |
| 6,833,966 B2* | 12/2004 | Nishioka et al. | ............ | 359/726 |
| 6,886,952 B2* | 5/2005 | Kaneko | ................ | 359/846 |
| 2002/0101646 A1 | 8/2002 | Ide et al. | ................ | 359/295 |

FOREIGN PATENT DOCUMENTS

| | | |
|---|---|---|
| JP | 60-57308 A | 4/1985 |
| JP | 2-178602 A | 7/1990 |
| KR | 10-0156128 B1 | 7/1998 |

* cited by examiner

*Primary Examiner*—Mohammed Hasan
(74) *Attorney, Agent, or Firm*—Birch, Stewart, Kolasch & Birch, LLP

(57) ABSTRACT

The present invention relates to a variably focusing mirror for realizing an automatic focusing and optical zooming of a miniature camera module, the mirror comprising a driving part having a supporting board and more than one permanent magnet attached on the supporting board; and a mirror having a coil, a reflective surface of which a curvature is changed by the magnitude and the direction of a current flowing through the coil and a thin film on which the reflective surface is incorporated. The variably focusing mirror according to the present invention can realize a focusing and an optical zooming by adjusting a curvature radius of a reflective surface. Therefore, it can remarkably decrease the volume of a camera module and be used in various applications requiring for a miniature camera module.

17 Claims, 11 Drawing Sheets

VARIABLY FOCUSING MIRROR DRIVEN BY ELECTROMAGNETIC FORCE AND OPERATING METHOD THEREOF

BACKGROUND OF THE INVENTION

1. Field of the Invention

The present invention relates to a variably focusing mirror driven by electromagnetic force for realizing an automatic focusing and an optical zooming of a miniature camera module, more specifically, to a variably focusing mirror driven by electromagnetic force for realizing a focusing and an optical zooming functions by adjusting a curvature radius of a reflective surface, instead of adjusting the position of a lens group using an electromagnetic driver or a step motor, and an operating method thereof.

In accordance with the recent developments of a communication technology and a digital information processing technology, a handheld terminal technology where an information processing, a calculation, a telecommunication and an image information input/output functions are incorporated, such as a Personal Digital Assistants PDA having a digital camera and a communication function and a handy phone having a digital camera and PDA functions, draws attention. It becomes a gradually recent trend to equip a digital camera module having a high specification due to the developments of a digital camera technology and an information storing technology.

As a mega pixel grade image sensor is used in a digital camera module equipped with a handheld terminal owing to the developments of various technologies, the functions of an automatic focusing and an optical zooming are considered more important than ever. In order to realize an automatic focusing and an optical zooming of a miniature digital camera module, a driver capable of satisfying capabilities such as high speed mobility, a low power consumption and a big displacement, occupying a relatively small volume, especially a driver capable of coping with an increase of displacements required for improving an optical zooming is required.

2. Background of the Related Art

The conventional camera module employs a method for changing positions of a lens group on an optical axis in order to realize an optical zooming and an automatic focusing. FIG. 1 is a conceptual view of a conventional camera module adopting an optical zooming and an automatic focusing using two lens group. When the optical zooming is realized, if a zoom lens group (1) is moved into a predetermined position, an automatic focusing lens group (2) is moved into a predetermined position determined by the position of the zoom lens group to form an image on an image sensor (3). In general, the zoom lens group of the second group lens type camera module with an optical zooming needs a relatively big displacement, and the automatic focusing lens group needs a high speed mobility.

Conventionally, as a method for changing the positions of a lens group, an electromagnetic driver such as a voice coil motor VCM or a driver performing a rotation such as a step motor was employed to linearly move a driving part by rotating a lead screw. The electromagnetic driver like VCM has a limit in increasing a displacement and is disadvantageous in that a power is continuously consumed in order to operate a zooming function. In addition, a driver performing a rotation like a step motor has disadvantages like a complicated mechanism or frictions and noises at a gear when linearly moving a driving part by rotating a lead screw. In addition, a driver using the VCM or a step motor has a difficult in manufacturing a cheap driver because of a complicated structure and decreasing its size. In conclusion, a conventional driver employing a mechanical driving method where a lens group is moved on an optical axis does not satisfy gradually complicated requirements in accordance with the improvements of a zooming and an image quality.

SUMMARY OF THE INVENTION

In order solve the above problems of the present invention, an object of the present invention is to provide a variably focusing mirror driven by electromagnetic force which can adjust a curvature radius of a reflective surface by an electromagnetic force and an operation method thereof.

The other object of the present invention is to provide camera module using the variably focusing mirror driven by electromagnetic force.

In order to solve the above problems, a variably focusing mirror driven by electromagnetic force comprises: a substrate having a through hole through which a light is inputted or reflected; a thin film stacked on the substrate; a lower conductive line stacked on the thin film; an insulating layer stacked on the lower conductive line for electrically insulating from the upper portion; and a coil stacked on the insulating layer.

It is preferable that a mirror surface be further comprised for reflecting an inputted light on a lower portion of the thin film.

It is preferable that a predetermined second insulating layer through hole be formed on a predetermined position of the insulating layer so that the lower conductive line is outwardly protruded.

It is preferable that an end of the coil comprise the first electrode pad for receiving a power source from the outside.

It is preferable that an end of the lower conductive line comprise the second electrode pad for receiving a power source from the outside.

It is preferable that a first insulating layer through hole be formed in the center of the insulating layer.

A variably focusing mirror driven by electromagnetic force comprises: a driving part having a supporting board and more than one permanent magnet attached on the supporting board; and a mirror having a coil, a reflective surface of which a curvature is changed by the magnitude and the direction of a current flowing through the coil and a thin film on which the reflective surface is incorporated at a position facing the driving unit.

In addition, it is preferable that the variably focusing mirror driven by electromagnetic force be manufactured by a microprocessing technology or a micromachining process.

It is preferable that the variably focusing mirror driven by electromagnetic force further have an insulating layer for insulating between the coil and the thin film.

It is preferable that the variably focusing mirror driven by electromagnetic force further have a means for flowing the current through the coil.

It is preferable that the reflective surface be formed of one out of metal, a dielectric and a stacked layer of metal and a dielectric.

It is preferable that the thin film be formed of more than one out of a semiconductor, a dielectric, ceramic, a polymer and metal.

It is preferable that the reflective surface has a circular shape.

The thin film may be formed to have a high optical transmittance.

It is preferable that the permanent magnet be cylindrical.

Moreover, it is preferable that the permanent magnet consist of a cylindrical internal permanent magnet and a hollow external permanent magnet surrounding the internal permanent magnet with a predetermined distance.

It is preferable that the supporting board be formed to have a high magnetic permeability.

In general, the thin film has a flat initial state like a general lens, but the flatness of the thin film may be applied by an initial predetermined deformation.

The present invention provides a camera module consisting of more than one variably focusing mirror driven by electromagnetic force and an image sensor that a light refracted from the variably focusing mirror driven by electromagnetic force reaches in the end.

The present invention provides a method for operating a variably focusing mirror driven by electromagnetic force comprising: forming an external magnetic field in a driving unit having a supporting board and more than one permanent magnet attached on the supporting board; flowing a current through the coil in the mirror having a coil, a reflective surface of which a curvature is changed by the magnitude and the direction of a current flowing through the coil and a thin film on which the reflective surface is incorporated at a position facing the driving part; and changing a curvature of the reflective surface ant the thin film by an interaction of the external magnetic field and a current flowing through the coil.

DETAILED DESCRIPTION OF THE INVENTION

Figure 1:
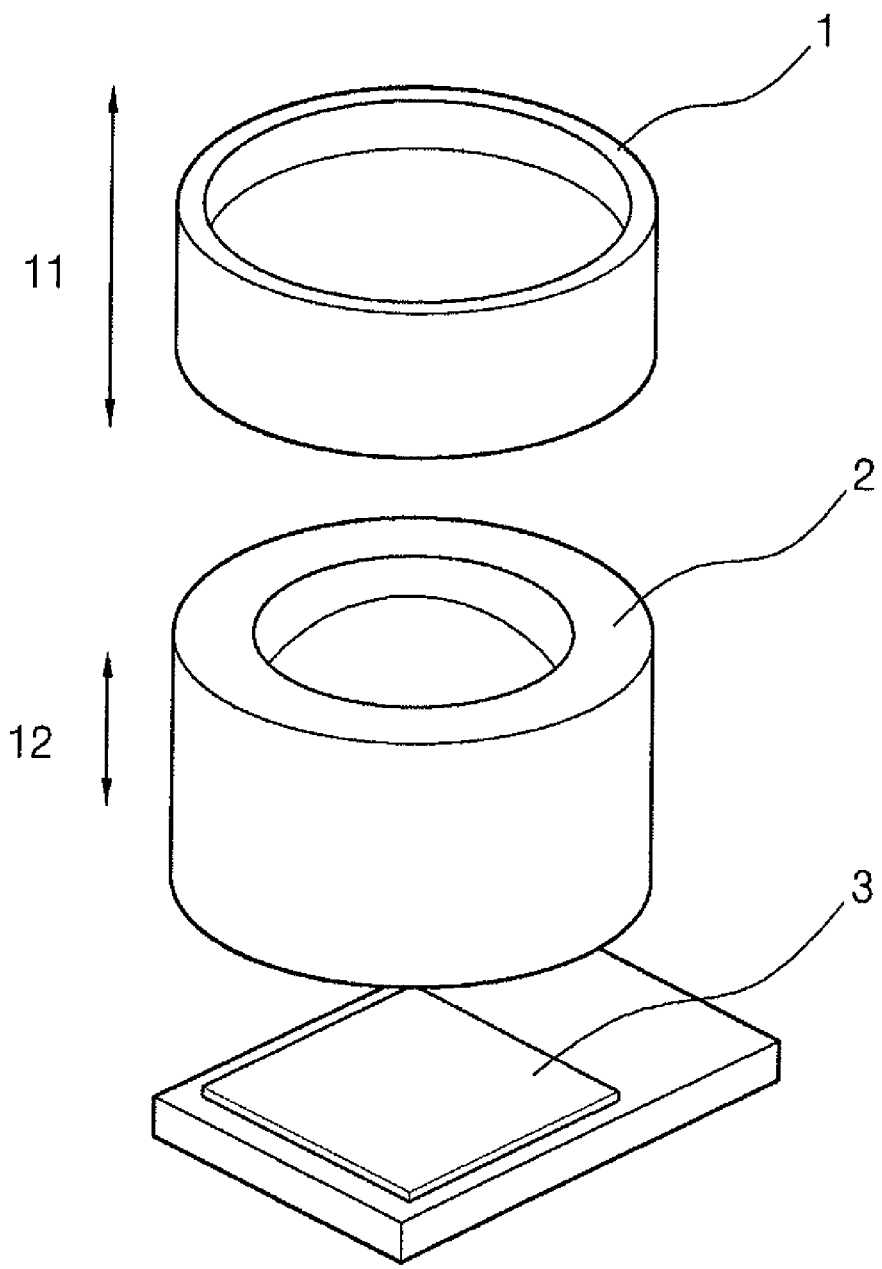
FIG. 1 is a conceptual view of the conventional second group lens type camera module with an optical zooming function.

The embodiments of the present invention will be described in detail with reference to the attached drawings. Reference now should be made to the drawings, in which the same reference numerals are used throughout the different drawings to designate the same or similar components. In the following description of the present invention, detailed descriptions may be omitted if it is determined that the detailed descriptions of related well-known functions and construction may make the gist of the present invention unclear.

Figure 2A:
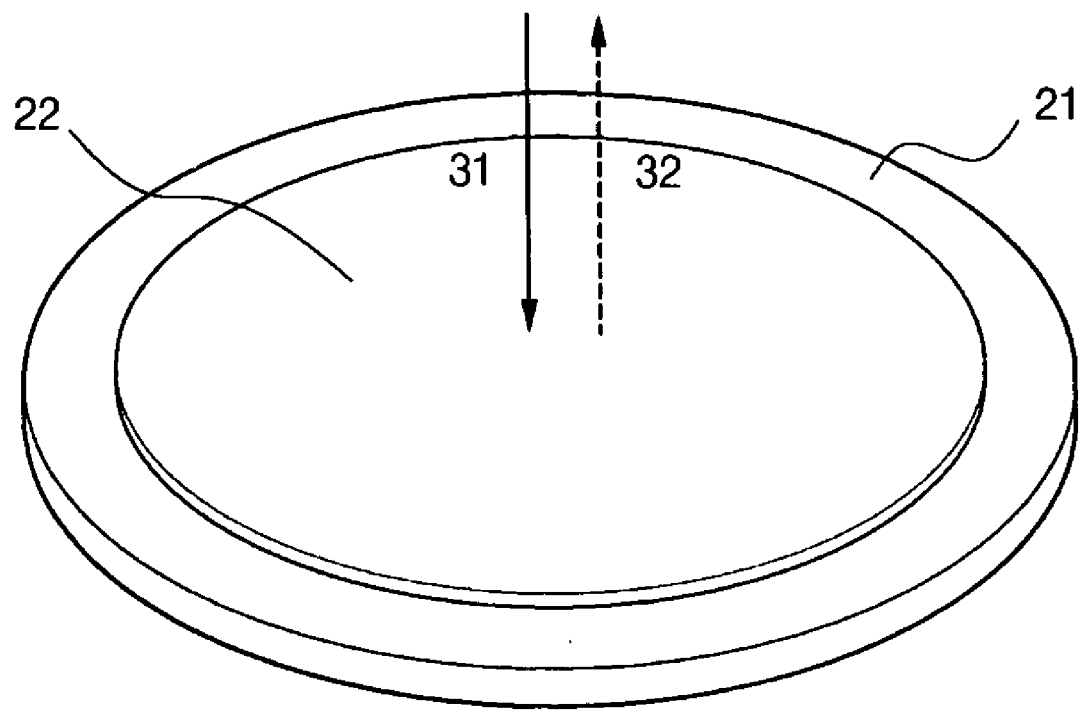
FIGS. 2a to 2c are perspective views showing a principle of the change of a focus distance depending on the change of a curvature in a variably focusing mirror driven by an electromagnetic force according to the present invention.
Figure 2B:
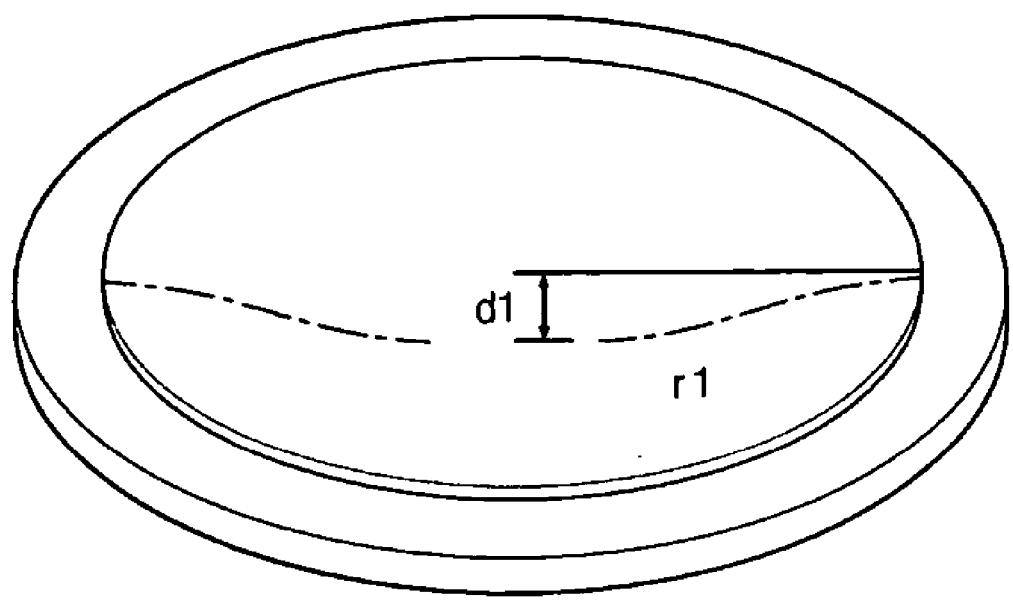
Figure 2C:
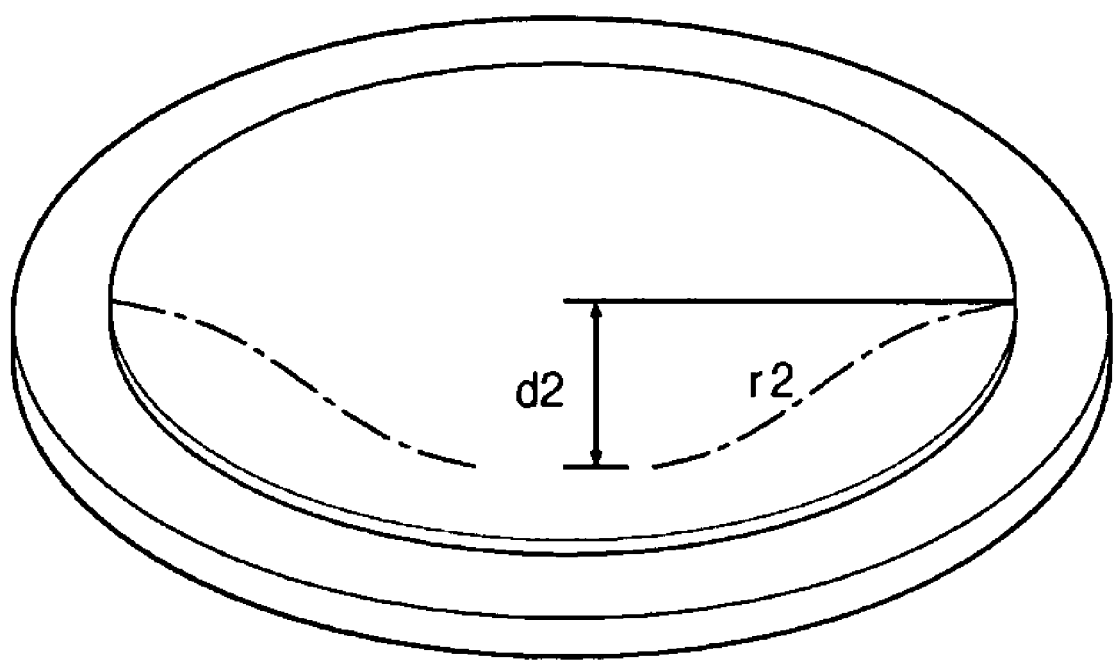

FIGS. 2a to 2c are perspective views showing the change of the radius of a curvature of a variably focusing mirror driven by an electromagnetic force and a principle of adjusting a focus depending on the change according to the present invention. FIG. 2a show an initial state, FIG. 2b shows the case that a displacement of a central portion is $d_1$, and FIG. 2c shows the case that a displacement of a central portion is $d_2$.

In an embodiment of FIG. 2a, the variably focusing mirror 21 includes a thin film 21 and a reflective surface 22 incorporated on the thin film.

The embodiment has the structure where a reflective surface 22 is formed on a circular thin film 21, and a focus distance of the reflective light 32 is changed depending on the change of a curvature of the thin film and the reflective surface. As shown in FIGS. 2b and 2c, in case that a center unit of the reflective surface makes a displacement by $d_1$ or $d_2$ in a lower direction, the curvature of the reflective surface is changed into $r_1$ or $r_2$ and a focus distance of the reflective light is changed, also.

Figure 3A:
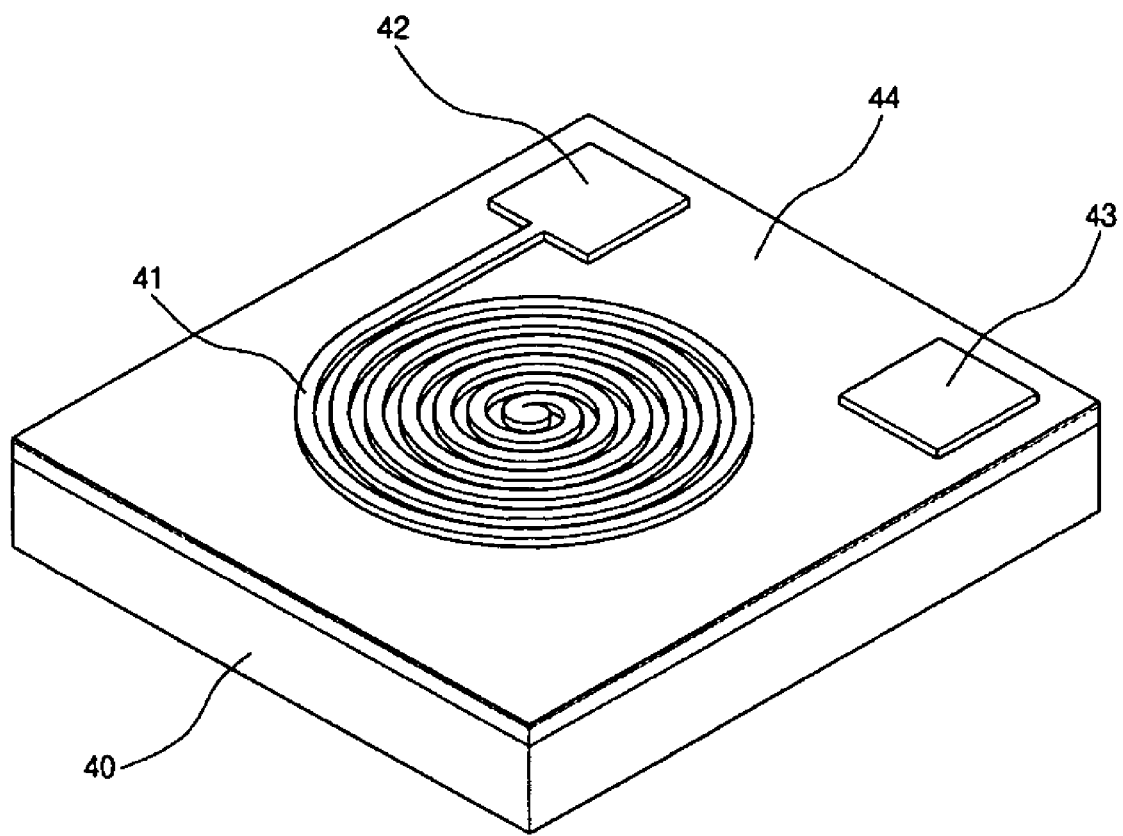
FIGS. 3a & 3b are perspective views showing one side and the other side of the variably focusing mirror driven by electromagnetic force according to the present invention.
Figure 3B:
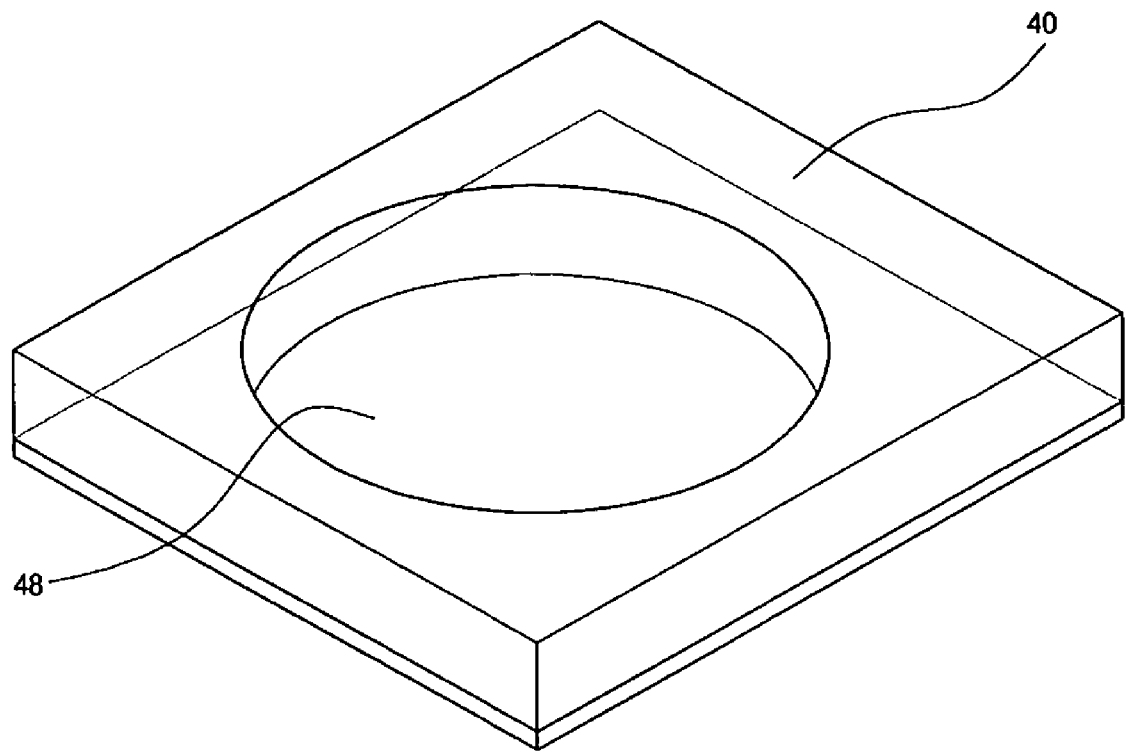

FIGS. 3a to 3b are perspective views showing one side and the other side of the variably focusing mirror driven by electromagnetic force according to the present invention.

In the embodiment of FIG. 3a, the mirror of a variably focusing mirror driven by electromagnetic force includes a substrate 40 having a through hole so that a light can be inputd or reflected, a thin film 48 formed on the substrate 40, an insulating layer 44 stacked on the thin film, the coil 41 formed on the insulating layer and a first and a second electrode pads 42 and 43.

In the embodiment, in case that a current flows through a coil 41 formed on the insulating layer 44 staked on the thin film 48, a curvature of the thin film 48 is changed by an interaction of the current flowing through the coil and an external magnetic field.

A light is inputted, refracted and reflected in a lower direction of a thin film in the embodiment of FIG. 3a and in an upper direction of the thin film in the embodiment of FIG. 3b.

Figure 4:
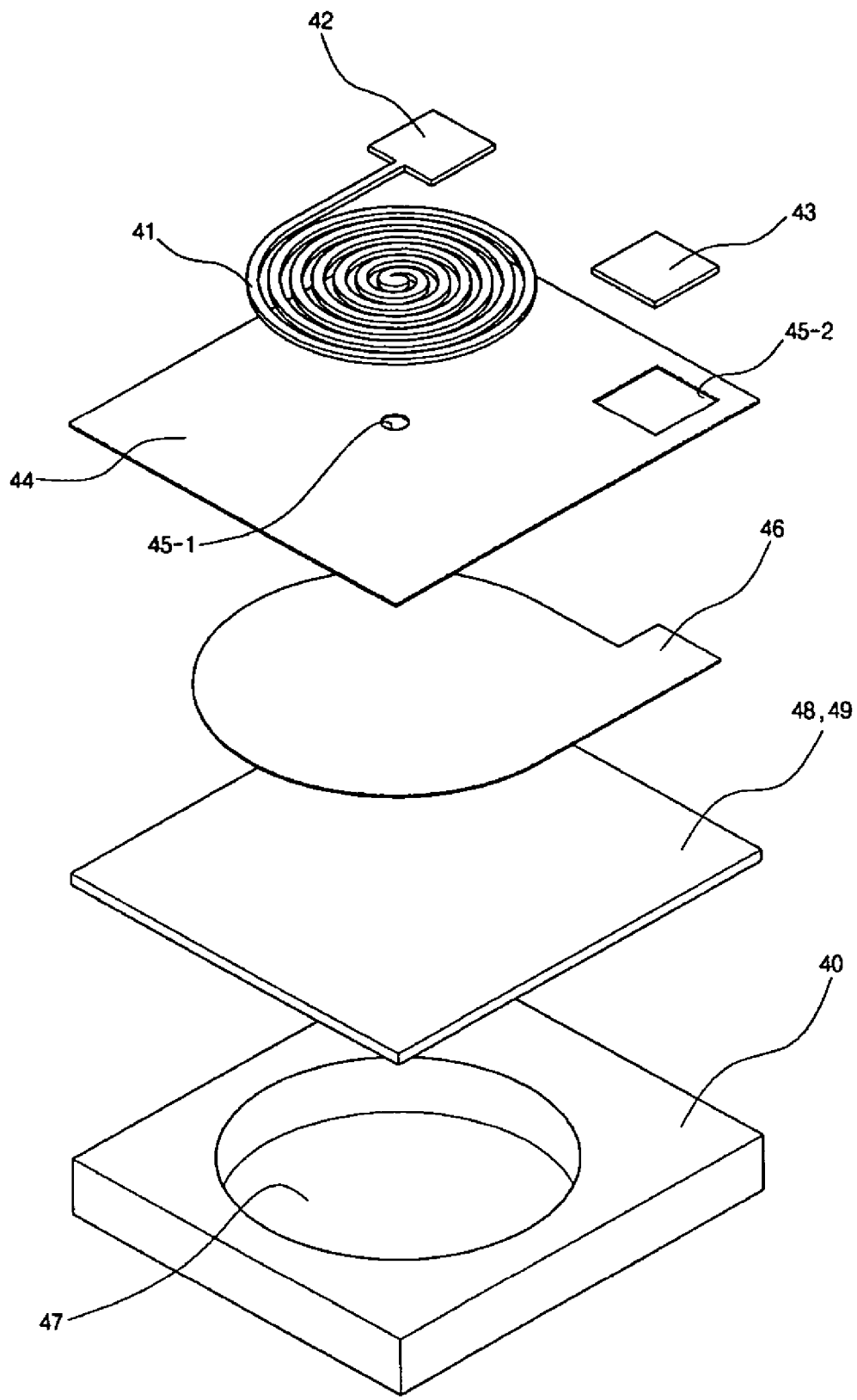
FIG. 4 is a perspective view showing the shape per layer of the variably focusing mirror driven by the electromagnetic force according to the present invention.
Figure 5:
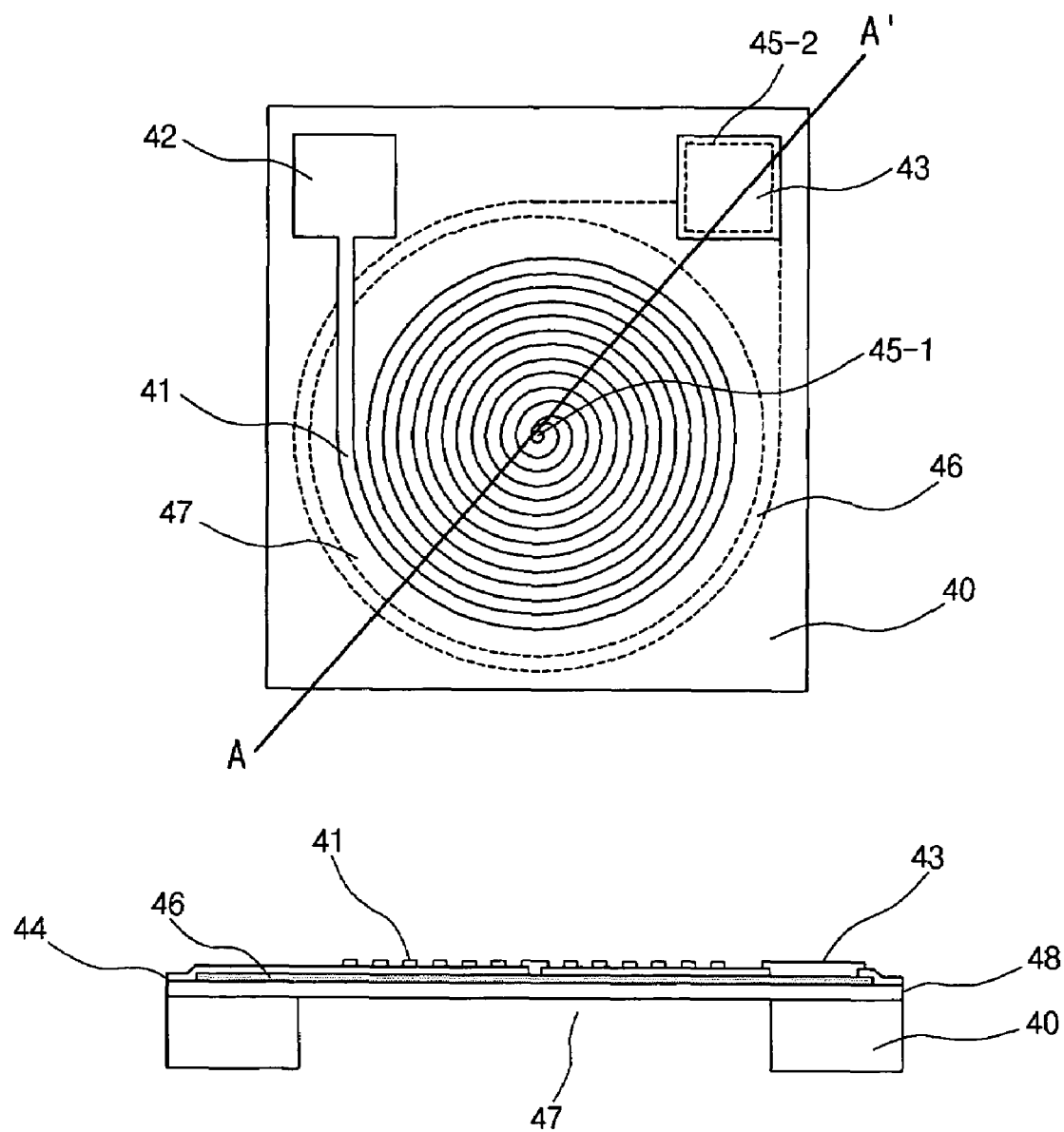
FIG. 5 includes a plan view and a cross-sectional view of the variably focusing mirror driven by electromagnetic force according to the present invention.

FIG. 4 shows the structure per layer of an embodiment of the variably focusing mirror driven by the electromagnetic force shown in FIG. 3a, and FIG. 5 includes a plan view and a cross-sectional view of an embodiment of a mirror of the variably focusing mirror driven by electromagnetic force shown in FIG. 3a.

In the embodiment of FIG. 4, the structure per layer of the mirror of a variably focusing mirror driven by electromagnetic force includes a substrate 40 on which the through hole 47 is formed, a thin film 48 positioned on the substrate, a lower conductive line 46 positioned on the thin film, an insulating layer 44 positioned on the lower conductive line and having the first and the second insulating layer through holes 45-1, 45-2, a coil 41 positioned on the insulating layer and the first and the second electrode pads 42 and 43 positioned on the insulating layer.

An embodiment of FIG. 5 shows that the structure per layer of a variably focusing mirror driven by electromagnetic force shown in the embodiment in FIG. 4 is sequentially integrated on a plan viewed from the uppermost layer and on a cross-section taken along the very middle. A thin film 48 is positioned on a substrate 40 where a through hole 47 is formed in the center, and a lower conductive line 46 is positioned on the thin film. An insulating layer 44 having the same outline as the substrate is positioned on the lower conductive line, and the coil 41 and the first and the second electrode pads 42 and 43 are positioned on the insulating layer. Viewed from the uppermost layer, the insulating layer completely covers the lower conductive line except the first insulting layer through hole 45-1 positioned in the very middle and the second insulating layer through hole 45-2 positioned not to approach the coil, therefore is prevented from contacting the lower conductive line, the most of the coil of the upper insulating layer and the first electrode pad. One end of the coil is positioned on the very upper position where the first insulating layer through hole 45-1 is formed and the other end of the coil is coupled with the first electrode pad. The second electrode pad is positioned on the very upper position where the second insulating layer 45-2 is formed. The lower conductive line contacts an end of the coil through the first insulating through hole (referred to as 'the first contact') and contacts the second electrode pad through the second insulating layer (referred to as 'the second contact'). The lower conductive line should be formed so that a current flows at a point between the point of first contact and the point of the second contact but is not limited in the shape.

In the embodiment of FIG. 4, a comprehensive structure per layer of a mirror has a shape where the thin film 48 and the coil 41 are incorporated on a substrate 40 where a through hole 47 is formed. In detail, an end of the coil 41 is electrically connected with the second electrode pad 43 through the lower conductive line 46 contacted through the second insulating layer 45-2 and the first insulating layer 45-1, and the other end of the coil 41 is electrically connected directly with the first electrode pad 42. The lower conductive line 46 forms pathways for the current to flow through the first and the second insulating layer through holes 45-1 and 45-2 formed on the insulating layer 44 together with the coil. If a voltage is applied between the first electrode pad 42 and the second electrode pad 43, a current flows through the coil 41. The current flowing through the coil 41 interacts with an external magnetic field formed in a driving part which will be described applies an electromagnetic force to a coil and the electromagnetic force is applied to the thin film 48 closely stacked to the coil and a reflective surface incorporated to the thin film to change a curvature of the thin film and the reflective surface.

The reflective surface 49 is incorporated into the thin film 48 to change a curvature and a thin film by an interaction of an external magnetic field and a current flowing through a coil by the driving part. The reflective surface can be incorporated on an upper side or a lower side of the thin film. In case that the thin film 48 is formed of a material with a high magnetic permeability, a reflective surface is incorporated on an upper side of a thin film like the embodiment of FIG. 4 to remove a lower conductive line 46 and form a pathway for a current to flow together with the coil instead of the lower conductive line. It is preferable that the reflective surface be formed of metal of Al, Au or Ag or more than one layered dielectric or a combination of metal and a dielectric.

It is preferable that the thin film 48 be formed of one or more than one out of a semiconductor like a silicon, a silicon nitride layer and a silicon oxide layer, a dielectric, ceramic, a polymer and metal. If a thin film is formed of a metal material, it is possible to remove a lower conductive line 46 in an embodiment of FIG. 4 so that the thin film may form a pathway through which a current flows together with the coil instead of the lower conductive line.

The reflective surface can have any shape only if a curvature is changed by an electromagnetic force generated by an interaction of an external magnetic field and a current flowing through a coil together with a thin film to change a focus but preferably be a lens shape or a circular.

It is preferable that the insulating layer 44 be formed of a silicon nitride layer, a silicon oxide layer, ceramic and a polymer.

It is preferable that the lower conductive line 46, the coil 41 and the first and the second electrode pads 42 and 43 be formed of all kinds of metal of Al, Ni, Cu, Au and Ag by a plating, a sputtering or a deposition method.

It is possible to adjust an initial flatness of a reflective surface by adjusting strengths of the thin film 48, the reflective surface 49 and the lower conductive line 46 during a manufacturing process. In general, the reflective surface and the thin film are manufactured to have a flat state, but can be manufactured to have a predetermined initial curvature on the reflective surface and the thin film at the state the variably focusing mirror driven by electromagnetic force is not operated.

Figure 6A:
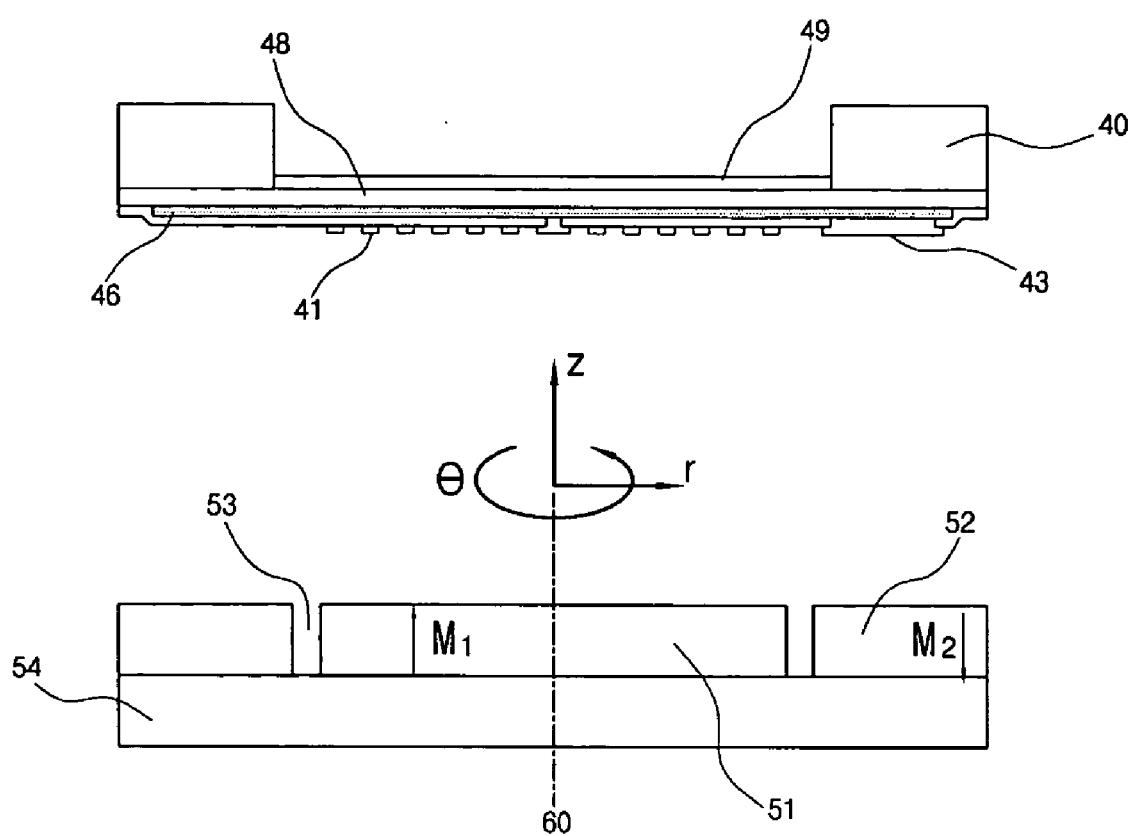
FIGS. 6a & 6b are a cross-sectional view and a perspective view of the variably focusing mirror driven by electromagnetic force according to the present invention.
Figure 6B:
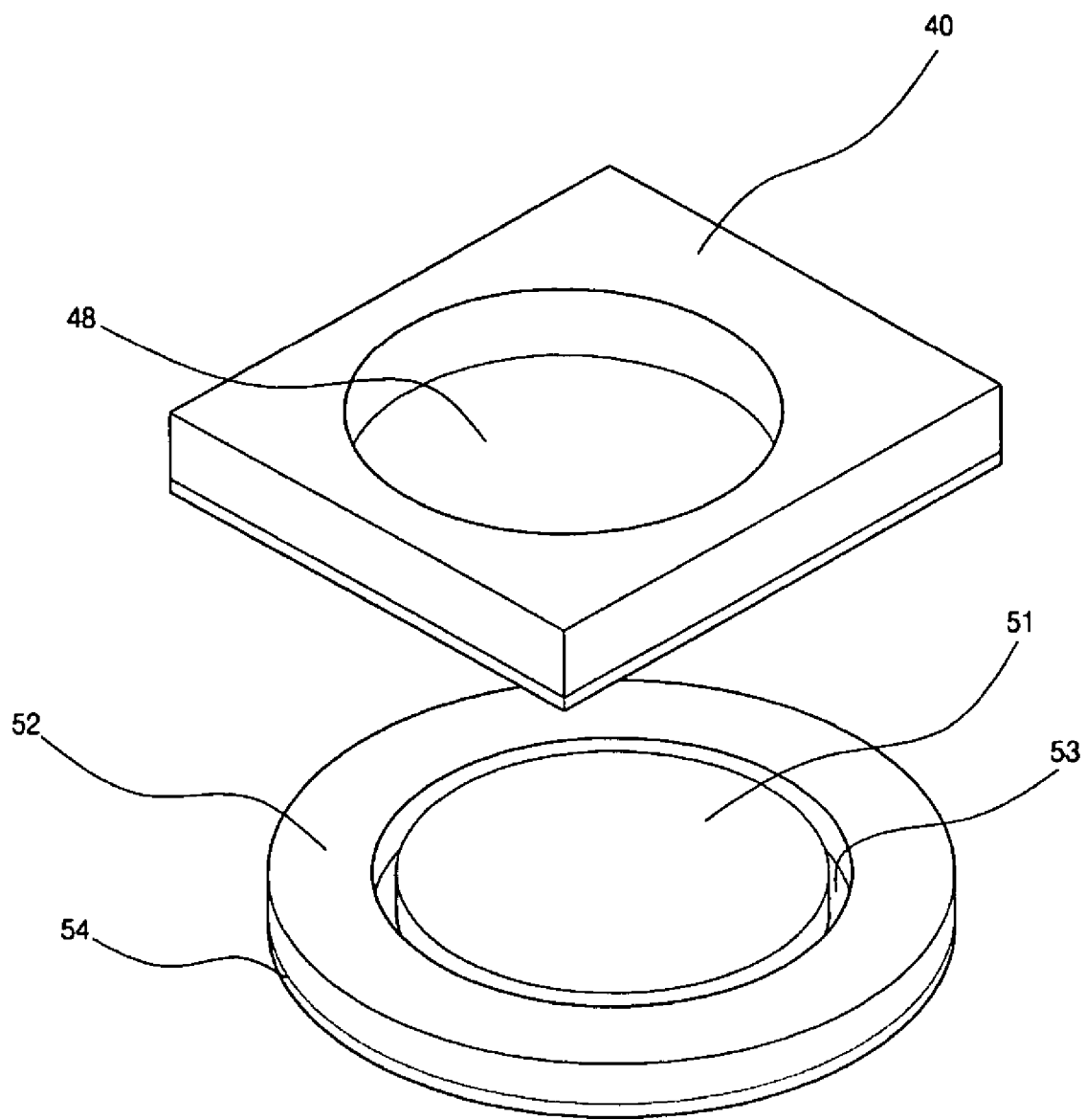

FIGS. 6a & 6b are a cross-sectional view and a perspective view showing an embodiment of the wholly variably focusing mirror driven by electromagnetic force including a driving part of the variably focusing mirror driven by electromagnetic force according to the present invention.

In the embodiment of FIG. 6a, the variably focusing mirror driven by electromagnetic force includes a mirror of the variably focusing mirror driven by electromagnetic force shown in the embodiment of FIGS. 3a & 3b, and a driving part having a supporting board 54, the first internal cylindrical permanent magnet 51 positioned on the supporting board and the second hollow permanent magnet 52 surrounding the first permanent magnet 51 with a predetermined distance 53. The mirror is positioned on the driving part and has a coil positioned at a lower portion of the thin film to be close to the driving part in the embodiment of FIG. 3b and in a vertically opposite direction in the embodiment of FIG. 3a. The reflective surface 49 is stacked on an upper side of a thin film of the mirror to reflect a light inputted from the upside upwardly.

In the embodiment of FIG. 6a, the supporting board and the thin film are placed on a plan to be parallel each other and a direction vertical to the plan is the z-direction. On each plan parallel with the plan on which the supporting board or the thin film is placed, a direction radially extending from a permanent magnet attached on the supporting board is the redirection. In addition, the supporting board and the thin film are positioned on an axis of the z-direction with the same center and a direction rotating counterclockwise on the axis of the z-direction is the θ-direction.

In the embodiment, a permanent magnet supplying an external magnetic field is deposited at a lower portion of a mirror having the thin film 48, and the magnetic field in the r-direction by the permanent magnet is interacted with the coil to become an external magnetic field driving the thin film 48. As a coil is placed on a plan vertical to the z-direction to have a flat spiral shape, the magnetic fields in other directions except the redirection out of the magnetic fields generated by the permanent magnet cannot generate an electromagnetic force (Lorentz force) or do not have effects, even if an electromagnetic force is generated. Because the generated electromagnetic force is shortly offsetted. If a magnetic field is formed in the r-direction by a permanent magnet and a current flows through the coil 41 in the θ-direction, the thin film 48 on which the coil 41 is formed is applied by an electromagnetic force in the z-direction.

Especially, in order to increase r-directional components of the magnetic field by a permanent magnet, it is more effective to use a cylindrical permanent magnet.

In addition, as a magnetic permeability of a material of the supporting board 54 disposed in the lower portion of the entire region of the permanent magnet is increased, a symmetry of magnetic fields by the permanent magnet is increased to more effectively generate an offset of an electromagnetic force by the magnetic field in other directions except the r-direction. Therefore, it is possible to obtain an electromagnetic force by a magnetic field in the redirection more effectively.

The driving part may use one permanent magnet but remarkably increase the magnitude of a magnetic field using two magnets 51 and 52 and the supporting board 54 as shown in FIGS. 6a and 6b. As shown in FIG. 6a, in case that the internal cylindrical magnet 51 is magnetized in the z-direction, and the external hollow cylindrical magnet 52 disposed with a predetermined distance 53 is magnetized in the −z-direction, the magnetic field in the r-direction is remarkably increased in comparison with the case using one magnet. In the case that the magnitude of a magnetic field is increased, the magnitude of a total electromagnetic field is proportional to the magnitude of the magnetic field. Therefore, it is possible to effectively drive a variably focusing mirror driven by electromagnetic force with a relatively small amount of current. In FIG. 6a, if a magnetic field is formed in the r-direction, and a current flows through the coil 41 in the θ-direction, the thin film 48 on which the coil 41 is formed is applied by an electromagnetic field in the −z-direction.

Figure 7:
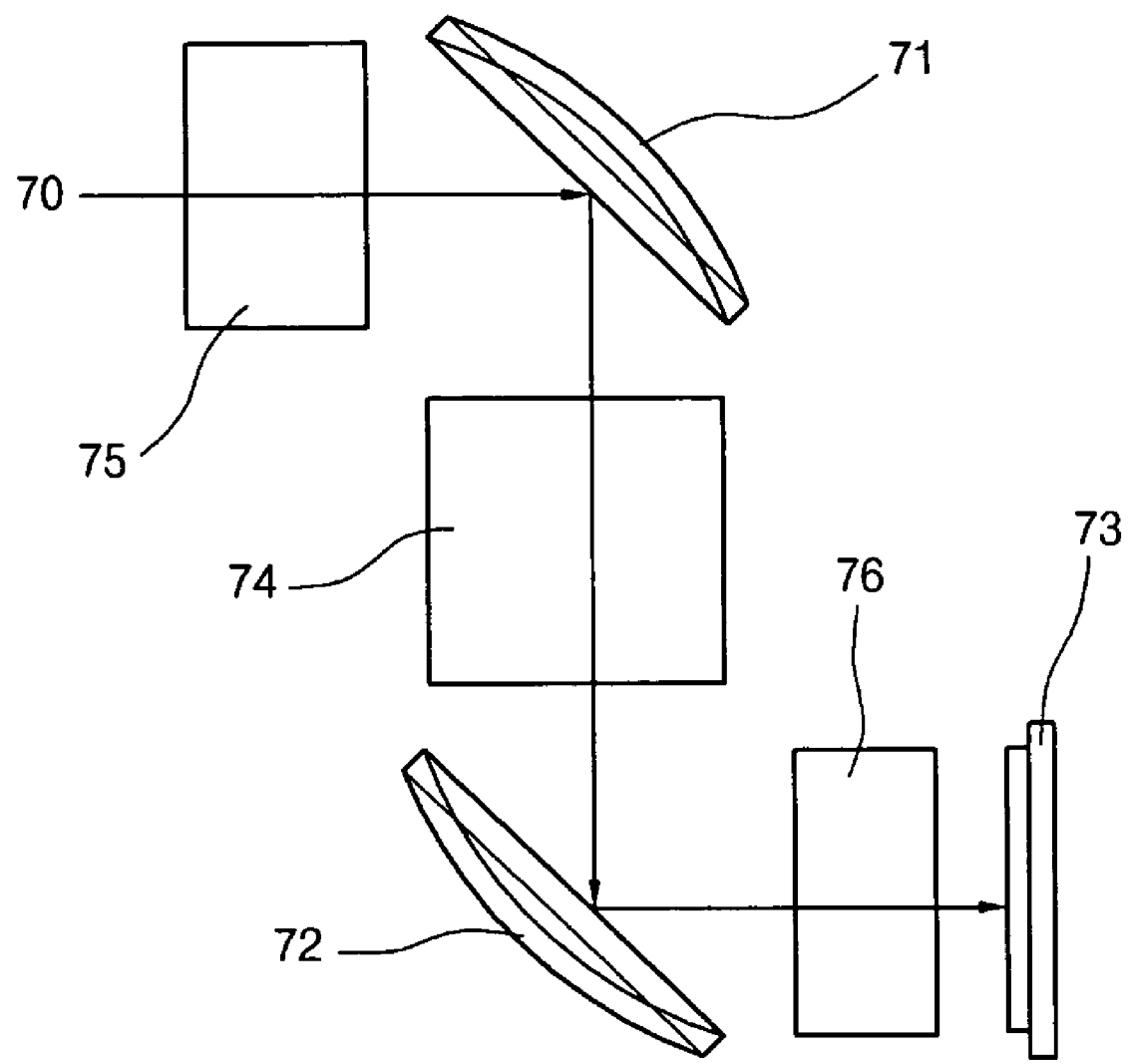
FIG. 7 is a conceptual view showing an embodiment of a camera module using two variably focusing mirrors driven by electromagnetic force.

FIG. 7 is a conceptual view showing an embodiment of a camera module using a variably focusing mirror driven by an electromagnetic force.

In the embodiment of FIG. 7, the camera module includes the first and the second variably focusing mirrors 71 and 72 driven by electromagnetic force and an image sensor 73 where a light finally reaches along an optical pathway 70 refracted from the first and the second variably focusing mirror. Moreover, the camera module selectively includes the first optical system 74 positioned on an optical pathway between the first and the second variably focusing mirrors driven by electromagnetic force, the second optical system 75 positioned on an optical pathway before a light is refracted to the first variably focusing mirror driven by the electromagnetic force and the third optical system 76 positioned on an optical pathway between the second variably focusing mirror driven by electromagnetic force and the image sensor.

In the camera module of the embodiment, two variably focusing mirrors 71 and 72 driven by electromagnetic force positioned in the refraction unit of the optical pathway 70 which is refracted toward the image sensor twice perform a focus adjustment function and an optical zooming function, respectively. The first and the second variably focusing mirrors 71 and 72 driven by electromagnetic force do not have a sequential order in performing a focus adjustment function and an optical zooming function. In other words, if one performs a focus adjustment function, the other performs an optical zooming function automatically. The first optical system 74 can be formed between the first and the second variably focusing mirrors 71 and 72 driven by electromagnetic force using an optical system such as a lens, a reflective surface, a filter, a mechanic shutter, an iris and so on. The second optical system 75 and the third optical system 76 may be formed respectively among the front end of the variably focusing mirror 71 driven by electromagnetic force and the variably focusing mirror 72 driven by electromagnetic force and the image sensor 73 using suitable optical systems.

A camera module using a variably focusing mirror driven by electromagnetic force can be constituted to selectively perform a focus adjustment function and an optical zooming function using one variably focusing mirror driven by electromagnetic force, or can be constituted into various optical pathways different from the embodiment using more than two variably focusing mirrors driven by electromagnetic force. In addition, a camera module using the conventional lens group moving method can be constituted to perform a part or all general functions of a camera module including a focus adjustment function and an optical zooming function.

A method for fabricating a variably focusing mirror driven by electromagnetic force now will be described.

The method for fabricating the variably focusing mirror comprises: forming a driver having a supporting board and more than one permanent magnet attached on the supporting board; forming a mirror having a coil and a reflective surface of which a curvature is changed by the magnitude and the direction of a current flowing through the coil and a thin film on which the reflective surface is incorporated; and depositing the driving part at a position facing the mirror. The above steps will be described with reference to the embodiments shown in the drawings.

A reflective surface is incorporated to a thin film which is attached on a substrate on which a through hole is formed and a coil is attached on the thin film to form the mirror. The reflective surface can be incorporated to an upper side or a lower side of the thin film. It is preferable that an insulating layer be included between the thin film and the coil. It is preferable that a means for flowing a current through the coil be included. The embodiment of FIG. 4 shows the structure per layer of a variably focusing mirror driven by electromagnetic force. In the embodiment, the mirror has the structure per layer of a substrate, a thin film, a lower conductive layer, an insulating layer, a coil and the first and the second electrode pads which are sequentially stacked upwardly from the bottom. The structure per layer is stacked sequentially to form the mirror. A reflective surface of the embodiment is incorporated into the thin film. In the embodiment, a means for flowing a current through the coil consists of a lower conductive line and the first and the second electrode pads.

The driving part is formed to attach more than one permanent magnet on a supporting board. At this time, the permanent magnet can have any shape but it is preferable that the permanent magnet be cylindrical. Furthermore, it is preferable that two permanent magnets including the first cylindrical permanent magnet positioned on the supporting board and the second cylindrical hollow surrounding the first permanent magnet positioned on the supporting board with a predetermined space be included as shown in the embodiment of FIGS. 6a and 6b.

The driving part and the mirror are disposed to face each other. As shown in FIGS. 6a and 6b, it is preferable that the mirror be positioned on the driving part, and a variably focusing mirror driven by electromagnetic force be formed by adjusting the film so that the side with a through hole of the substrate is up.

It is preferable that the reflective surface, the thin film and the supporting board be formed of the above mentioned materials.

A method for operating a variably focusing mirror driven by electromagnetic force will be described hereinafter. The method for operating a variably focusing mirror driven by electromagnetic force comprises: forming an external magnetic field in a driving part having a supporting board and more than one permanent magnet attached on the supporting board; flowing a current through the coil in the mirror having a coil, a reflective surface of which a curvature is changed by the magnitude and the direction of a current flowing through the coil and a thin film on which the reflective surface is incorporated at a position facing the driving part; and changing a curvature of the reflective surface ant the thin film by an interaction of the external magnetic field and a current flowing through the coil. The above steps now will be described with reference to the embodiment shown in the drawings.

The step of forming an external magnetic field is a step for generating a magnetic field by a permanent magnet attached on a supporting board of the driving part. In the embodiment of FIG. 6a, the external magnetic field generated by the first permanent magnet and the second permanent magnet is formed in the mirror including a coil. As described in the embodiment of FIG. 6a, only the magnetic fields in the r-direction out of the external magnetic fields generated from the permanent magnets of the driving part generate effective electromagnetic force in the coil.

The step for flowing a current through a coil is a step for applying a voltage between both ends of a means for flowing a current through the coil at the state that both ends of the coil are electrically connected with the means capable of flowing a current through the coil. In the embodiment of FIG. 5, the other end of the coil 41 is electrically connected with the first electrode pad 42, one end of the coil 41 is electrically connected with the lower conductive line 46 through the first insulating layer through hole 45-1 and the lower conductive line is electrically connected with the second electrode pad 43 through the second insulating layer through hole 45-2 to form a pathway for a current to flow between the first electrode pad and the second electrode pad. If a voltage is applied between the first electrode pad and the second electrode pad, a current flows through a coil.

As shown in FIG. 6a, in the step for changing a curvature of the reflective surface and the thin film by an interaction of the external magnetic field and the current flowing through the coil, if a magnetic field by a permanent magnet is formed in the r-direction and a current flows through the coil 41 in the θ-direction, an electromagnetic force is operated to the coil 41 in the −z-direction, and the electromagnetic force is operated to a thin film stacked close to a coil and a reflective surface integrated to the thin film to change a curvature of the thin film and the reflective surface. As the electromagnetic force has the different magnitude depending on the magnitude of a current flowing through the coil and the different direction depending on the direction of a current flowing through the coil, it is possible to adjust the change of a curvature of the thin film and the reflective surface. The variably focusing mirror driven by electromagnetic force has a changing focus depending on the change of a curvature of a reflective surface according to the above method to perform a focusing adjustment function and an optical zooming function.

The present invention has been described with reference to the preferred embodiments, but it is apprehended that the present invention can be modified and changed in various ways within the spirit and scope of the present invention described in the claims by those skilled in the art.

According to the present invention, as a curvature radius of a reflective surface is changed using an electromagnetic force instead of moving the position of a lens group using an electromagnetic force in order to adjust a focus of the mirror, it is possible to attain a fast focus adjustment and a relatively big displacement. In addition, there are no mechanical movements, and the problems concerning noises or frictions are not raised. Moreover, a relatively low power is consumed.

According to the present invention, the relatively simple, light and small volumed variable focusing mirror in comparison with the conventional electromagnetic driver can perform the same functions. If it is employed in a camera module, a camera can be miniaturized and light-weighted.

What is claimed is:

1. A variably focusing mirror driven by electromagnetic force comprising:
    a substrate having a through hole through which a light is inputted or reflected;
    a thin film stacked on the substrate;
    a lower conductive line stacked on the thin film;
    an insulating layer stacked on the lower conductive line; and
    a coil stacked on the insulating layer,
    wherein a first insulating layer through hole is formed in the center of the insulating layer, and
    wherein the insulating layer electrically insulates the lower conductive line from the coil.

2. The variably focusing mirror driven by electromagnetic force of claim 1, further comprising: a mirror surface for reflecting an inputted light on a lower portion of the thin film.

3. The variably focusing mirror driven by electromagnetic force of claim 1, wherein a predetermined second insulating layer through hole is formed on a predetermined position of the insulating layer so that the lower conductive line is outwardly protruded.

4. The variably focusing mirror driven by electromagnetic force of claim 1, wherein an end of the coil comprises a first electrode pad for receiving a power source from the outside.

5. The variably focusing mirror driven by electromagnetic force of claim 1, wherein an end of the lower conductive line comprises a second electrode pad for receiving a power source from the outside.

6. A variably focusing mirror driven by electromagnetic force comprising: a driving part a supporting board and more than one permanent magnet attached on the supporting board; and a mirror having a coil, curvature of a reflective surface of the mirror being changed by the a magnitude and a direction of a current flowing through the coil and a thin film on which the reflective surface is incorporated at a position facing the driving part, wherein the mirror further has an insulating layer for insulating between the coil and the thin film, and wherein an insulating layer through hole is formed in a center of the insulating layer.

7. The variably focusing mirror driven by electromagnetic force of claim 6, wherein the minor further has a means for flowing the current through the coil.

8. The variably focusing mirror driven by electromagnetic force of claim 6, wherein the reflective surface is formed of one out of metal, a dielectric and a stacked layer of metal and a dielectric.

9. The variably focusing minor driven by electromagnetic force of claim 6, wherein the thin film is formed of more than one of a semiconductor, a dielectric, ceramic, a polymer and metal.

10. The variably focusing minor driven by electromagnetic force of claim 6, wherein the reflective surface has a circular shape.

11. The variably focusing mirror driven by electromagnetic force of claim 6, wherein the thin film is formed to have a high optical transmittance.

12. The variably focusing mirror driven by electromagnetic force of claim 6, wherein the permanent magnet is cylindrical.

13. The variably focusing mirror driven by electromagnetic force of claim 6, wherein the permanent magnet includes a cylindrical internal permanent magnet and a hollow external permanent magnet surrounding the internal permanent magnet with a predetermined distance.

14. The variably focusing minor driven by electromagnetic force of claim 6, wherein the supporting board is formed to have a high magnetic permeability.

15. The variably focusing minor driven by electromagnetic force of claim 6, wherein the flatness of the thin film is applied by an initial predetermined deformation.

16. A camera module comprising more than one variably focusing minor driven by electromagnetic force of claim 6 and an image sensor that a light refracted from the variably focusing mirror driven by electromagnetic force reaches at an end of an optical pathway of the light.

17. A method for operating a variably focusing mirror driven by electromagnetic force, comprising: forming an external magnetic field in a driving part having a supporting board and more than one permanent magnet attached on the supporting board; flowing a current through a coil in the mirror having the coil, curvature of a reflective surface of the mirror being changed by a magnitude and a direction of a current flowing through the coil and a thin film on which the reflective surface is incorporated at a position facing the driving part; and changing a curvature of the reflective surface and the thin film by an interaction of the external magnetic field and a current flowing through the coil, wherein the mirror further has an insulating layer for insulating between the coil and the thin film, and wherein an insulating layer through hole is formed in a center of the insulating layer.

* * * * *